(12) United States Patent
Chiu

(10) Patent No.: US 8,314,841 B2
(45) Date of Patent: Nov. 20, 2012

(54) IMAGE STABILIZER AND RELATED IMAGING MODULE AND RELATED ELECTRONIC DEVICE

(75) Inventor: Chi-Wei Chiu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 397 days.

(21) Appl. No.: 12/728,258

(22) Filed: Mar. 21, 2010

(65) Prior Publication Data

US 2011/0050922 A1 Mar. 3, 2011

(30) Foreign Application Priority Data

Sep. 2, 2009 (CN) .......................... 2009 1 0306471

(51) Int. Cl.
*H04N 5/228* (2006.01)
*G03B 17/00* (2006.01)

(52) U.S. Cl. ................ 348/208.11; 348/208.2; 348/374; 396/55

(58) Field of Classification Search ............. 348/208.11; 396/55

See application file for complete search history.

(56) References Cited

U.S. PATENT DOCUMENTS

| 7,995,908 | B2 * | 8/2011 | Chiu et al. | 396/55 |
| 8,244,120 | B2 * | 8/2012 | Chiu | 396/55 |
| 2012/0044370 | A1 * | 2/2012 | Ku | 348/208.6 |

* cited by examiner

*Primary Examiner* — Ngoc-Yen Vu
(74) *Attorney, Agent, or Firm* — Altis Law Group, Inc.

(57) ABSTRACT

An exemplary image stabilizer includes a stationary supporting frame, a moveable frame, a driving assembly and a resilient assembly. The moveable frame is moveably received in the stationary supporting frame and spaced from the stationary supporting frame. The driving assembly includes a first magnetic member and a second magnetic member. The first magnetic member is positioned on the stationary supporting frame. The second magnetic member is positioned on the moveable frame. The driving assembly is configured for driving the moveable frame to rotate relative to the stationary supporting frame through interaction between the first magnetic member and the second magnetic member. The resilient assembly interconnects the stationary supporting frame and the moveable frame and is configured for counter-rotating the moveable frame relative to the stationary supporting frame.

14 Claims, 5 Drawing Sheets

US 8,314,841 B2

IMAGE STABILIZER AND RELATED IMAGING MODULE AND RELATED ELECTRONIC DEVICE

BACKGROUND

1. Technical Field

The present disclosure relates to image stabilizers and related imaging modules and related electronic devices.

2. Description of Related Art

An imaging module typically includes an image sensor for converting light into electrical signals. The electrical signals can be processed to form images. If the imaging module experiences vibration or movement during image capturing, the image sensor is likely to form blurred images.

Therefore, there is a need for an image stabilizer and a related imaging module and a related electronic device, in which the above problems are eliminated or at least alleviated.

DETAILED DESCRIPTION

Figure 1:
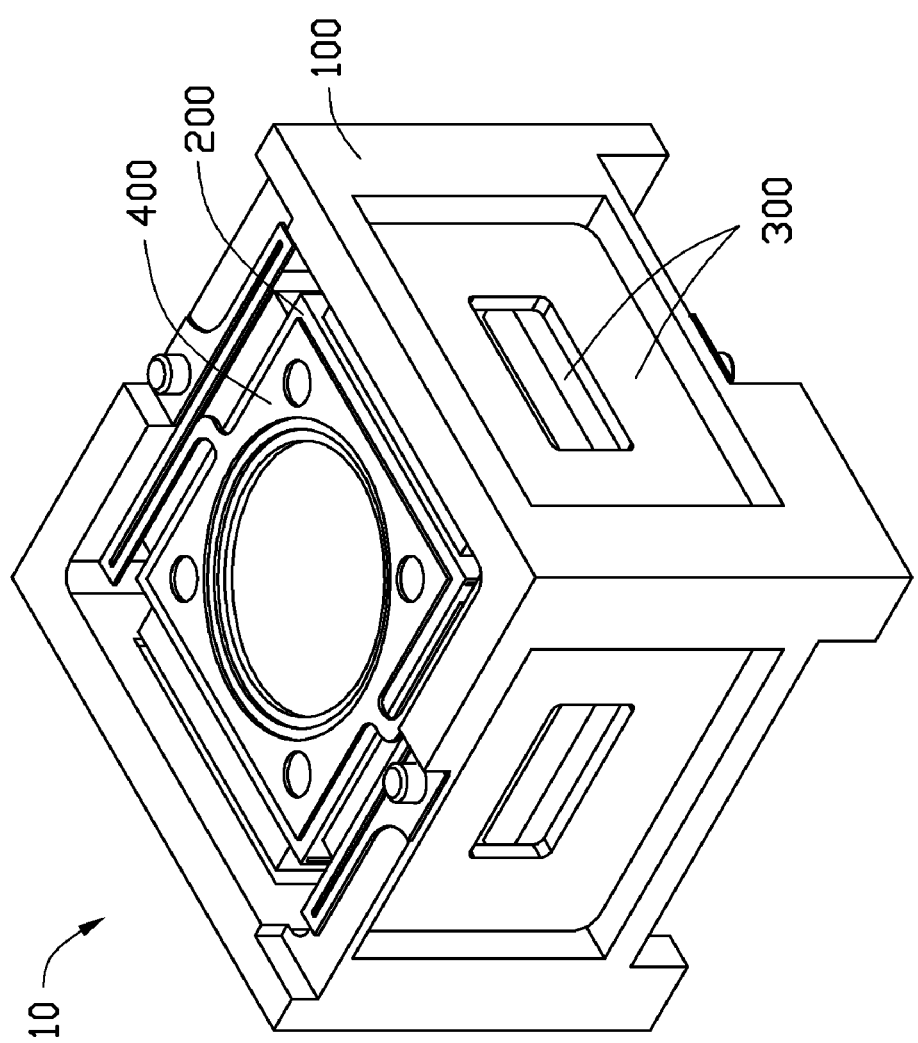
FIG. 1 is an isometric and schematic view of an image stabilizer, according to a first exemplary embodiment.
Figure 2:
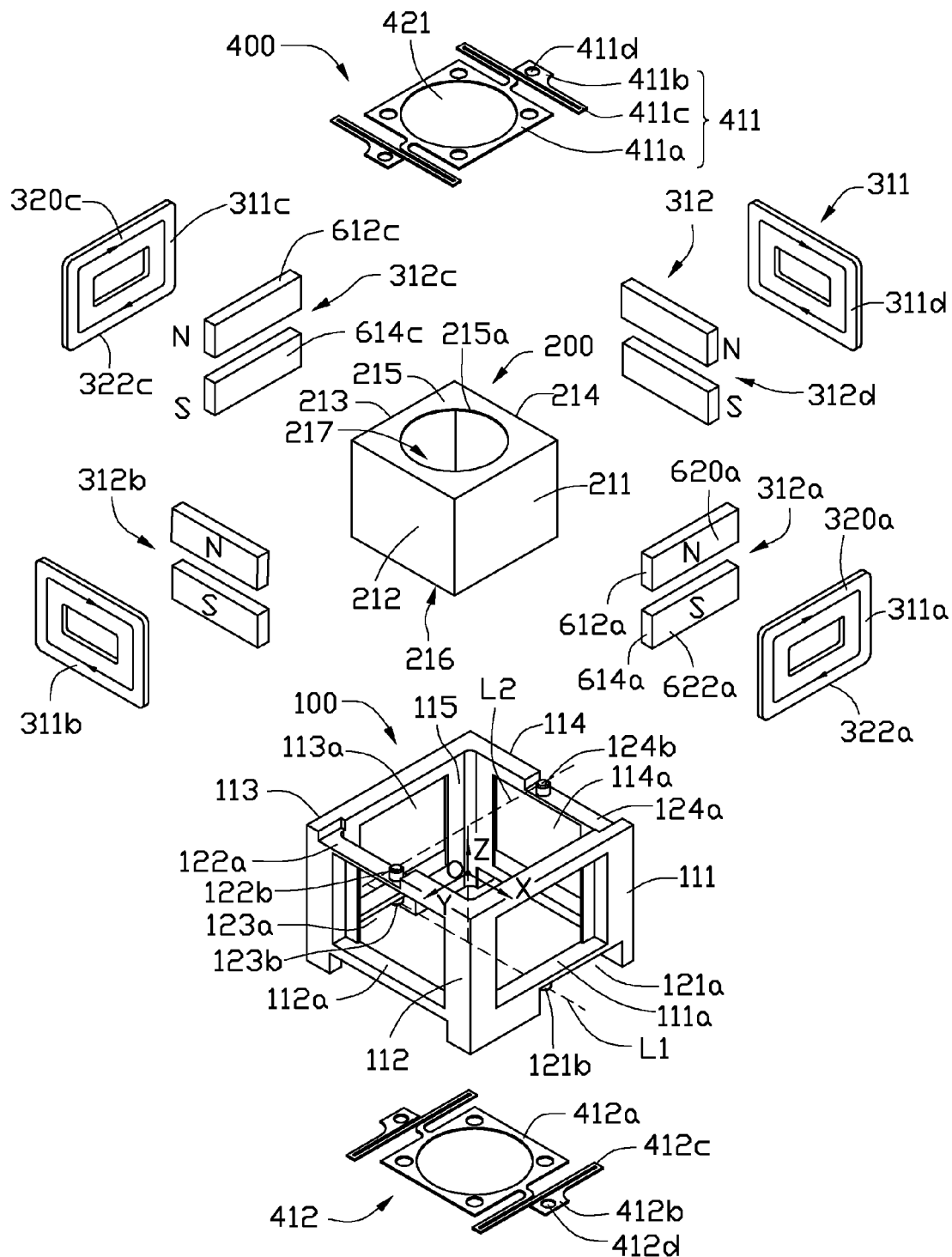
FIG. 2 is an exploded view of the image stabilizer of FIG. 1.

Referring to FIGS. 1-2, an image stabilizer 10, according to a first exemplary embodiment, includes a stationary supporting frame 100, a moveable frame 200, a driving assembly 300, and an resilient assembly 400.

The stationary supporting frame 100 may be fixed to an electronic device, such as a digital camera. The stationary supporting frame 100 is substantially cuboid-shaped and includes a first sidewall 111, a second sidewall 112, a third sidewall 113, and a fourth sidewall 114. The first, second, third and fourth sidewalls (111, 112, 113, and 114) are connected perpendicularly end to end in that order and cooperatively define a first receiving space 115.

The first sidewall 111 defines a first receiving hole 111a. The second sidewall 112 defines a second receiving hole 112a. The third sidewall 113 defines a third receiving hole 113a. The fourth sidewall 114 defines a fourth receiving hole 114a. The receiving holes 111a, 112a, 113a, and 114a are in communication with the first receiving space 115.

The first sidewall 111 includes a first positioning groove 121a at a lower side thereof and a first positioning post 121b in the positioning groove 121a. The height of the first positioning post 121b is substantially same as the depth of the first positioning groove 121a. The first positioning post 121b is located at a middle of the lower side of the first sidewall 111. The third sidewall 113 includes a third positioning groove 123a at a lower side thereof and a third positioning post 123b in the third positioning groove 123a. Configurations of the third positioning groove 123a and the third positioning post 123b are substantially same as those of the first positioning groove 121a and the first positioning post 121b. The positioning grooves 121a, 123a are positioned in a centrally symmetric relationship with respect to a midpoint of a section of the line passing through the centers of the positioning posts 121b, 123b. Therefore, the line passing through the centers of the positioning posts 121b, 123b is defined as a first line L1.

The second sidewall 112 includes a second positioning groove 122a at an upper side thereof and a second positioning post 122b in the second positioning groove 122a. The height of the second positioning post 122b is substantially same as the depth of the second positioning groove 122a. The second positioning post 122b is located at a middle of the upper side of the second sidewall 112. The fourth sidewall 114 includes a fourth positioning groove 124a at an upper side thereof and a fourth positioning post 124b in the fourth positioning groove 124a.

Configurations of the fourth positioning groove 124a and the fourth positioning post 124b are substantially same as those of the second positioning groove 122a and the second positioning post 122b. The positioning grooves 122a, 124a are positioned in a centrally symmetric relationship with respect to a midpoint of a section of the line passing through the centers of the positioning posts 122b, 124b. Therefore, the line passing through the centers of the positioning posts 122b, 124b is defined as a second line L2. In this embodiment, the first line L1 is spatially perpendicular to the second line L2. A first central axis of the stationary supporting frame 100 perpendicularly passes through the first and second lines L1, L2. A coordinate system is defined as following: the first central axis of the stationary supporting frame 100 is defined as Z axis. A line perpendicular to the Z axis, and parallel to the first L1 and passing through a midpoint of a section of the line passing through the first and second lines L1, L2 is defined as X axis. A line perpendicular to the Z and X axes and passing through the midpoint of a section of the line passing through the first and second lines L1, L2 is defined as Y axis, as shown in FIG. 2.

The moveable frame 200 is substantially a hollow cube and has a second central axis coinciding with the first central axis (Z axis) of the stationary supporting frame 100. The moveable frame 200 is moveably received in the first receiving space 115 and spaced from the stationary supporting frame 100.

The moveable frame 200 defines a second receiving space 217 therein and includes a first outer side surface 211, a second outer side surface 212, a third outer surface 213, a fourth outer surface 214, an upper surface 215, and a lower surface 216. The first outer side surface 211, the second outer side surface 212, the third outer surface 213, and the fourth outer surface 214 are connected perpendicularly end to end in that order. The upper surface 215 and the lower surface 216 connect the first outer side surface 211, the second outer side surface 212, the third outer surface 213, and the fourth outer surface 214. The upper surface 215 defines a light incident hole 215a in communication with the second receiving space 217.

The driving assembly 300 includes a first magnetic member 311 positioned on the stationary supporting frame 100 and a second magnetic member 312 positioned on the moveable frame 200. The first magnetic member 311 faces the second magnetic member 312. The driving assembly 300 is configured for driving the moveable frame 200 to rotate about the X axis and the Y axis relative to the stationary supporting frame 100 through interaction between the first magnetic member 311 and the second magnetic member 312.

In detail, the first magnetic member 311 includes a first coil 311a, a second coil 311b, a third coil 311c, and a fourth coil 311d. Each coil is substantially a rectangular ring and is fixedly received in a corresponding receiving hole. That is, the first coil 311a is fixedly received in the first receiving hole 111a. The second coil 311b is fixedly received in the second receiving hole 112a. The third coil 311c is fixedly received in the third receiving hole 113a. The fourth coil 311d is fixedly received in the fourth receiving hole 114a.

The second magnetic member 312 includes a first magnet unit 312a, a second magnet unit 312b, a third magnet unit 312c, and a fourth magnet unit 312d. Each magnet unit is positioned on a corresponding outer side surface and faces a corresponding coil to interact with the corresponding coil. That is, the first magnet unit 312a is positioned on the first outer side surface 211 and faces the first coil 311a. The second magnet unit 312b is positioned on the second outer side surface 212 and faces the second coil 311b. The third magnet unit 312c is positioned on the third outer side surface 213 and faces the third coil 311c. The fourth magnet unit 312d is positioned on the fourth outer side surface 214 and faces the fourth coil 311d.

Each magnet unit includes an upper magnet and a lower magnet. A magnetic pole of the upper magnet facing a corresponding coil is opposite to a magnetic pole of the lower magnet facing the corresponding coil. For example, the first magnet unit 312a includes an upper magnet 612a and a lower magnet 614a. A first magnetic pole 620a of the upper magnet 612a facing the first coil 311a is opposite to a second magnetic pole 622a of the lower magnet 614a facing the first coil 311a. In this embodiment, the first magnetic pole is magnetic north, and the second magnetic pole is magnetic south, as shown in FIG. 2.

The resilient assembly 400 interconnects the stationary supporting frame 100 and the moveable frame 200. In this embodiment, the resilient assembly 400 includes an upper resilient sheet 411 and a lower resilient sheet 412.

The upper resilient sheet 411 includes a moveable portion 411a, a stationary portion 411b and a bent portion 411c. The bent portion 411c connects the moveable portion 411a and the stationary portion 411b. The shape of the moveable portion 411a is substantially the same as that of the upper surface 215. The moveable portion 411a defines a through hole 421 having a diameter slightly greater than that of the light incident hole 215a. The through hole 421 is aligned with the light incident hole 215a. The moveable portion 411a is fixedly attached to the upper surface 215 and moves together with the moveable frame 200.

In this embodiment, the bent portion 411c includes two bent arms 411c. The stationary portion 411b includes two stationary plates 411b received in the positioning grooves 122a, 124a. The bent arms 411c and the stationary plates 411b extend from opposite sides of the moveable portion 411a along the Y axis in that order. The two bent arms 411c are symmetrical about the X axis. The two stationary plates 411b are symmetrical about the X axis. The bent arm 411c includes two bent parts which can provide a symmetrical/even elastic force.

Each stationary plate 411b defines a positioning hole 411d. The positioning posts 122b, 124b extend through the two positioning holes 411d so that the upper resilient sheet 411 is positioned on the second sidewall 112 and the fourth sidewall 114.

Structure of the lower resilient sheet 412 is substantially same as that of the upper resilient sheet 411. The moveable portion 412a of the lower resilient sheet 412 is fixedly attached to the lower surface 216 and moves together with the moveable frame 200. The two bent arms 412c are symmetrical about the Y axis. The two stationary plates 412b are received in the positioning grooves 121a, 123a and are symmetrical about the Y axis. The positioning posts 121b, 123b extend through the two positioning holes 412d so that the lower resilient sheet 412 is positioned on the first sidewall 111 and the third sidewall 113. Therefore, the moveable frame 200 is elastically supported in the stationary supporting frame 100 by the resilient sheets 411, 412 of the resilient assembly 400.

Figure 3:
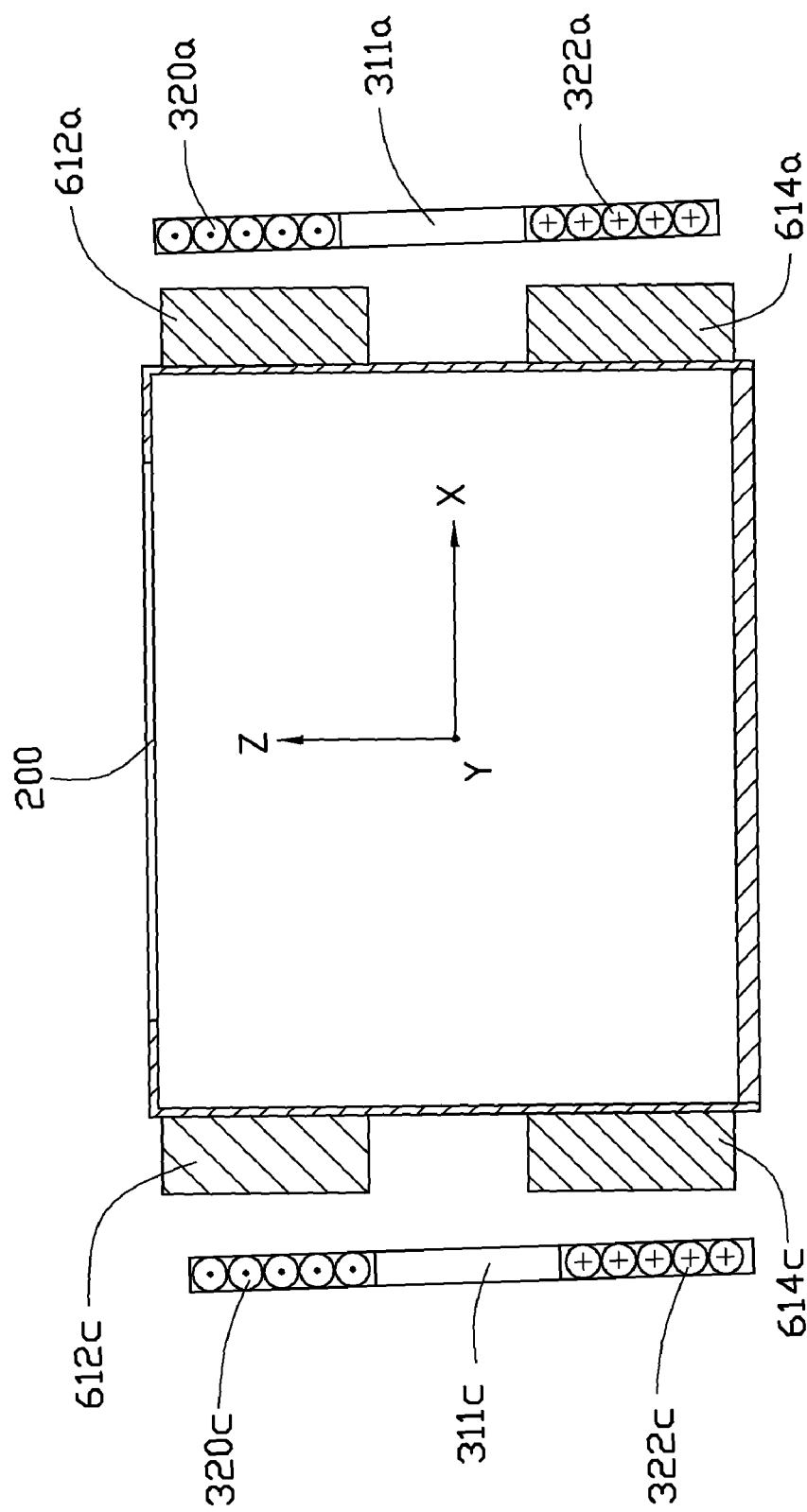
FIG. 3 is a schematic view of a working principle of the image stabilizer of FIG. 2.

Referring to FIG. 3, dots shown in the coil represents that a current in the coil goes perpendicularly towards the paper, and crosses shown in the coil represents that the current in the coil goes perpendicularly away from the paper. When in use, for example, currents applied to the first coil 311a and the third coil 311c are shown as ring-shaped lines with arrows in the coils 311a, 311c in FIG. 2. Therefore, the first coil 311a and the third coil 311c generate magnetic fields. Accordingly, an attractive force is applied to the upper magnet 612a by an upper lengthwise side 320a of the first coil 311a, and a repellent force is applied to the lower magnet 614a by the lower lengthwise side 322a of the first coil 311a. Similarly, a repellent force is applied to the upper magnet 612c by an upper lengthwise side 320c of the third coil 311c, and an attractive force is applied to the lower magnet 614c by the lower lengthwise side 322c of the third coil 311c. Therefore, a clockwise torque force about the Y axis is applied to the moveable frame 200 and the moveable frame 200 is driven to move clockwise about the Y axis. Meanwhile, the bent portions 411c, 412c are deformed because of a movement of the moveable frame 200. When the currents in the coils 311a, 311c are gone, the bent portions 411c, 412c are restored to drive the moveable frame 200 counterclockwise about the Y axis.

Similarly, when currents applied to the second coil 311b and the fourth coil 311d are shown as ring-shaped lines with arrows in the coils 311b, 311d in FIG. 2, the moveable frame 200 is driven to rotate about the X axis by interaction between the coils 311b, 311d and the magnet units 312b, 312d. When the currents in the coils 311b, 311d are gone, the bent portions 411c, 412c are restored to drive the moveable frame 200 to an initial position.

It is to be understood that in alternative embodiments, the first magnetic pole may be magnetic south, and the second magnetic pole may be magnetic north. Directions of currents applied to the coils 311a, 311b, 311c, and 311d may be changed accordingly. The first magnetic member may include a plurality of magnet units and the second magnetic member may include a plurality of coils.

Figure 4:
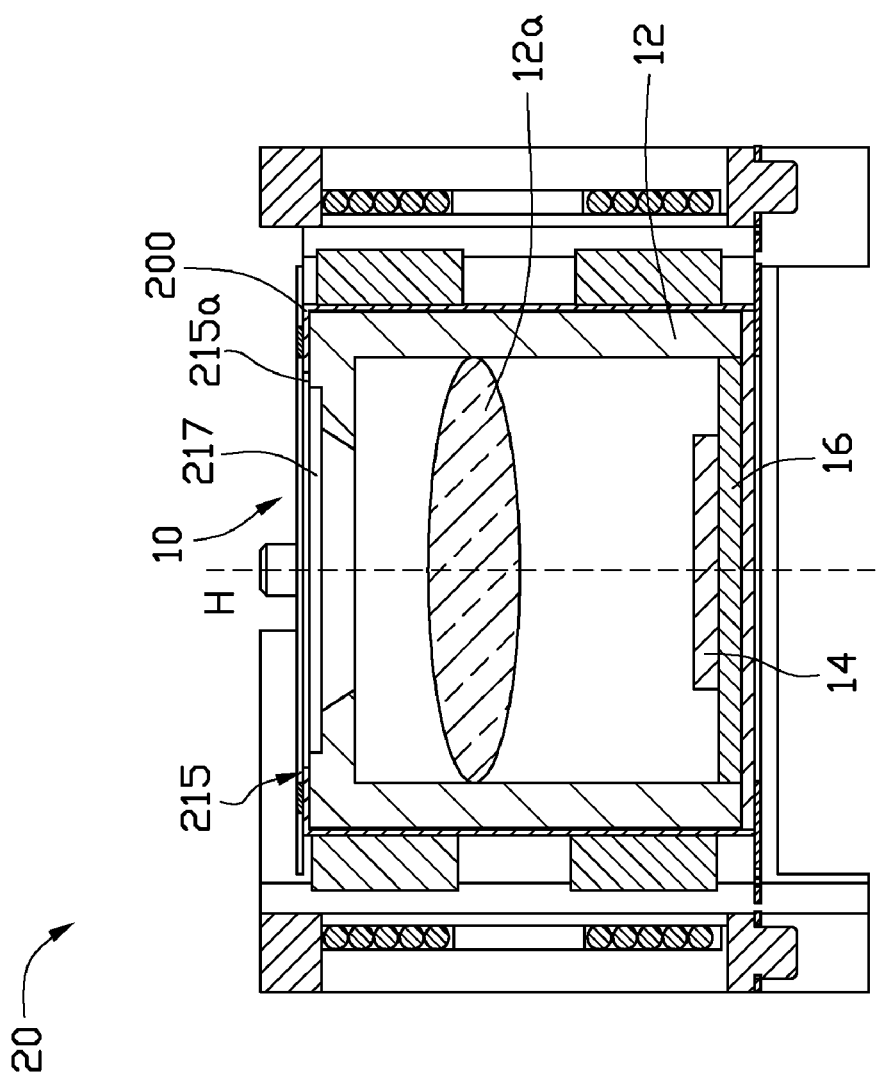
FIG. 4 is a sectional view of an imaging module according to a second exemplary embodiment.

Referring to FIG. 4, an imaging module 20, according to a second exemplary embodiment, includes the image stabilizer 10, a lens module 12, an image sensor 14 and a circuit board 16.

The lens module 12, and the image sensor 14 and the circuit board 16 are received in that order in the second receiving space 217 of the moveable frame 200. The lens module 12 may be an auto-focus lens module having such as an actuator to drive a lens 12a. An optical axis H of the lens module 12 is aligned with the image sensor 14. The image sensor 14 is positioned on the circuit board 16 and is electrically connected to the circuit board 16. The optical axis H of the lens module 12 is aligned with a center of the light incident hole 215a of the upper surface 215 and coincides with the second central axis of the moveable frame 200. When the imaging module 20 experiences vibration or movement, the lens module 12 and the image sensor 14 together with the moveable frame 200 are driven to rotate about the X and/or Y axes to compensate the vibration or movement.

Figure 5:
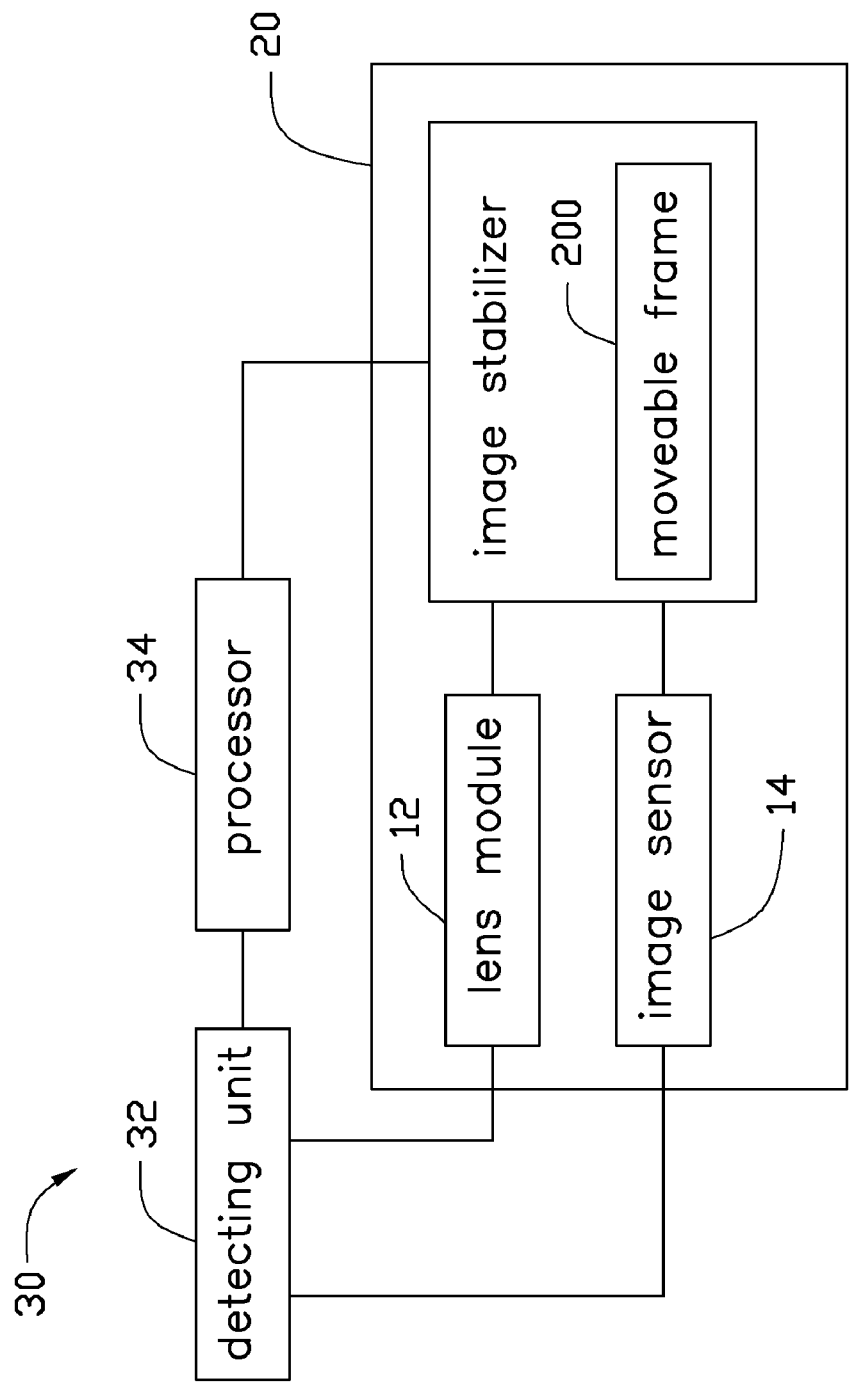
FIG. 5 is a functional block diagram of an electronic device, according to a third exemplary embodiment.

Referring to FIGS. 2 and 4-5, an electronic device 30, according to a third exemplary embodiment, includes the imaging module 20, a detecting unit 32 and a processor 34. The electronic device 30 may be a cell phone or a digital camera.

The detecting unit 32 may be attached to for example, the lower surface 216 of the moveable frame 200 and is configured for detecting vibration or movement of the moveable frame 200 when the electronic device 30 experiences vibration or movement. Because the lens module 12 and the image sensor 16 are received in the moveable frame 200, vibration or movement of the lens module 12 and the image sensor 14 is also detected. The detecting unit 32 may include a two-axis gyroscope.

The processor 34 is configured for controlling the driving assembly 300 to drive the moveable frame 200 to rotate according to the detected vibration or movement of the moveable frame 200. In this embodiment, the processing 34 selectively applies currents to the coils 311a, 311b, 311c, and 311d of the first magnetic member 311 according to the detected vibration or movement of the moveable frame 200. Therefore, the lens module 12 and the image sensor 14 together with the moveable frame 200 are driven to rotate about the X and/or Y axes to compensate the vibration or movement by interaction between the electrified coils and the corresponding magnet unit.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An image stabilizer, comprising:
   a stationary supporting frame comprising a first central axis;
   a moveable frame moveably received in the stationary supporting frame and spaced from the stationary supporting frame, the moveable frame comprising a second central axis coinciding with the first central axis;
   a driving assembly comprising a first magnetic member and a second magnetic member, the first magnetic member positioned on the stationary supporting frame, the second magnetic member positioned on the moveable frame and facing the first magnetic member, the driving assembly configured for driving the moveable frame to rotate about a first axis and a second axis relative to the stationary supporting frame through interaction between the first magnetic member and the second magnetic member, the first axis being perpendicular to the second axis, the first axis and the second axis being perpendicular to the first central axis; and
   a resilient assembly interconnecting the stationary supporting frame and the moveable frame, the resilient assembly configured for counter-rotating the moveable frame relative to the stationary supporting frame, the resilient assembly comprising two resilient sheets, each resilient sheet comprising a moveable portion, a stationary portion and a bent portion connecting the moveable portion and the stationary portion, the moveable portions positioned on the moveable frame, and the stationary portions positioned on the stationary supporting frame.

2. The image stabilizer of claim 1, wherein the stationary supporting frame comprises four sidewalls each defining a receiving hole, the first magnetic member received in the four receiving holes.

3. The image stabilizer of claim 2, wherein the moveable frame comprises four outer side surfaces each facing a corresponding sidewall, the second magnetic member positioned on the four outer side surfaces.

4. The image stabilizer of claim 3, wherein the first magnetic member comprises four electromagnets each received in a corresponding receiving hole.

5. The image stabilizer of claim 4, wherein the second magnetic member comprises four magnet units each positioned on a corresponding outer side surface and facing a corresponding electromagnet.

6. The image stabilizer of claim 5, wherein each magnet unit comprises an upper magnet and a lower magnet, a magnetic pole of the upper magnet facing a corresponding electromagnet being opposite to a magnetic pole of the lower magnet facing the corresponding electromagnet.

7. An imaging module, comprising:
   an image stabilizer comprising:
      a stationary supporting frame comprising a first central axis;
      a moveable frame moveably received in the stationary supporting frame and spaced from the stationary supporting frame, the moveable frame comprising a second central axis coinciding with the first central axis;
      a driving assembly comprising a first magnetic member and a second magnetic member, the first magnetic member positioned on the stationary supporting frame, the second magnetic member positioned on the moveable frame, the driving assembly configured for driving the moveable frame to rotate about a first axis and a second axis relative to the stationary supporting frame through interaction between the first magnetic member and the second magnetic member, the first axis being perpendicular to the second axis, the first axis and the second axis being perpendicular to the first central axis; and
      a resilient assembly interconnecting the stationary supporting frame and the moveable frame, the resilient assembly configured for counter-rotating the moveable frame relative to the stationary supporting frame, the resilient assembly comprising two resilient sheets, each resilient sheet comprising a moveable portion, a stationary portion and a bent portion connecting the moveable portion and the stationary portion, the moveable portions positioned on the moveable frame, and the stationary portions positioned on the stationary supporting frame;
   a lens module received in the moveable frame; and
   an image sensor received in the moveable frame and positioned at the image side of the lens module, an optical axis of the lens module and aligned with the image sensor.

8. The imaging module of claim 7, wherein the second central axis of the moveable frame coincides with the optical axis of the lens module.

9. The imaging module of claim 7, wherein the stationary supporting frame comprises four sidewalls each defining a receiving hole, the first magnetic member received in the four receiving holes.

10. The imaging module of claim 9, wherein the moveable frame comprises four outer side surfaces each facing a corresponding sidewall, the second magnetic member positioned on the four outer side surfaces.

11. The imaging module of claim 10, wherein the first magnetic member comprises four electromagnets each received in a corresponding receiving hole.

12. The imaging module of claim 11, wherein the second magnetic member comprises four magnet units each positioned on a corresponding outer side surface and facing a corresponding electromagnet.

13. The imaging module of claim 12, wherein each magnet unit comprises an upper magnet and a lower magnet, a magnetic pole of the upper magnet facing a corresponding electromagnet being opposite to a magnetic pole of the lower magnet facing the corresponding electromagnet.

14. An electronic device, comprising:
 an imaging module of claim 7;
 a detecting unit configured for detecting vibration or movement of the moveable frame; and
 a processor configured for controlling the driving assembly to drive the moveable frame to rotate according to the detected vibration or movement of the moveable frame.

* * * * *